United States Patent
Cases Rocati et al.

(10) Patent No.: US 6,193,780 B1
(45) Date of Patent: Feb. 27, 2001

(54) PROCESS AND APPARATUS FOR THE RECOVERY OF ALUMINUM AND ENERGY FROM USED ALUMINUM-PLASTIC PACKAGES

(76) Inventors: Jose Cases Rocati, deceased, late of Valencia (ES), by M. Desamparados Olmos Ibañez, José Manuel Cases Olmos, Vincente Enrique Cases Olmos, Pablo Emilio Cases Olmos, heirs; M. Desamparados Olmos Ibañez, Avenida del Cid, 54 Puerta 14, E-46018, Valencia (ES); JoséManuel Cases Olmos, Avenida del Cid, 54 Puerta 14, E-46018, Valencia (ES); Vincente Enrique Cases Olmos, Avenida del Cid, 54 Puerta 14, E-46018, Valencia (ES); Pablo Emilio Cases Olmos, Avenida del Cid, 54 Puerta 14, E-46018, Valencia (ES)

( * ) Notice: Subject to any disclaimer, the term of this patent is extended or adjusted under 35 U.S.C. 154(b) by 0 days.

(21) Appl. No.: 08/983,003

(22) PCT Filed: Apr. 29, 1997

(86) PCT No.: PCT/ES97/00111
§ 371 Date: Jul. 27, 1998
§ 102(e) Date: Jul. 27, 1998

(87) PCT Pub. No.: WO97/41269
PCT Pub. Date: Nov. 6, 1997

(30) Foreign Application Priority Data

Apr. 29, 1996 (ES) .................................................. 9600966

(51) Int. Cl.[7] .................................................. C22B 21/00
(52) U.S. Cl. ............................ 75/353; 75/403; 29/403.4; 29/17.2; 156/344; 156/584
(58) Field of Search .................... 75/353, 403; 29/403.1, 29/403.2, 403.3, 403.4, 426.4, 17.2; 156/344, 584

(56) References Cited

U.S. PATENT DOCUMENTS

| | | | |
|---|---|---|---|
| 3,650,830 | 3/1972 | Mathis | 134/19 |
| 3,777,680 | 12/1973 | Eck | 110/225 |
| 4,016,003 | * 4/1977 | Stauffer | 75/403 |
| 4,091,825 | * 5/1978 | Baker | 134/2 |
| 4,654,088 | * 3/1987 | Fitzpatrick et al. | 75/403 |
| 5,232,489 | * 8/1993 | Mertens-Gottselig et al. | 75/715 |
| 5,456,739 | 10/1995 | Donalisio | 75/403 |
| 5,772,041 | * 6/1998 | Kertscher et al. | 209/11 |

FOREIGN PATENT DOCUMENTS

| | | |
|---|---|---|
| 2250422 | 1/1975 | (FR) . |
| 2140141A | 11/1984 | (GB) . |
| 2572721 | 11/1984 | (FR) . |
| 54-154477 | * 12/1979 | (JP) . |
| WO 95/03127 | 2/1995 | (WO) . |
| 98-53969 | * 12/1998 | (WO) . |

* cited by examiner

Primary Examiner—George Wyszomierski
(74) Attorney, Agent, or Firm—Wiggin & Dana

(57) ABSTRACT

Process for the recovery of aluminum and energy from used aluminum-plastic packages and oven for implementing such process, which comprises a pretreatment for the recovery of paper, the separation of aluminum and of recyclable products by pyrolysis of polyethylene, essentially for their energy content. The product to be treated is passed into a chamber of which the walls are heated to a temperature preferably between 300° C. and 500° C., the walls being inclined in order to collect into a container a heavy fraction from the polyethylene pyrolysis, whereas the light fraction, which volatilizes, is burnt. The process is carried out in an oven which contains a series of trays, and wherein circulates a heating gas. The upper surface of the oven has the shape of an inverted cone, with an orifice at the apex through which passes its axis. The heavy fraction of the pyrolysis drains therethrough and is collected separately from the aluminum.

20 Claims, 8 Drawing Sheets

ALUMINUM+(POLYMER)

PROCESS AND APPARATUS FOR THE RECOVERY OF ALUMINUM AND ENERGY FROM USED ALUMINUM-PLASTIC PACKAGES

This is a National stage of PCT/ES97/00111, filed Apr. 29, 1997.

DESCRIPTION

1. Subject of the Invention

This specification refers to a process for the recovery of aluminum and energy from used packages and an oven for implementing such process; the obvious purpose is to obtain therefrom the recovery of the aluminum which is incorporated in the package itself, and at the same time the energy originating from the recovery process; another object of the invention is an oven for implementing the process that permits the recovery of the aluminum and the production of energy.

2. Field of the Invention

This invention has an application in the industrial field that is engaged in the recovery or treatment of polymer residues by treatment with dry heat, or with steam, as well as in the industrial field that is engaged in the manufacture of special equipment and machinery for implementing the aforementioned recovery of polymer residues, and it can also be used in the industrial field that is engaged in the destruction of solid wastes or transforming them into something useful and harmless, and it can also be used in the industrial field that is engaged in the destructive distillation of carbonaceous materials and for the recovery of aluminum from urban wastes.

BACKGROUND OF THE INVENTION

The applicant is aware that packages with various trade names, which are made of a material that is composed of a sheet of aluminum covered on both sides, by a film of plastic, usually low-density polyethylene, and an outer layer of paper, are currently being distributed in the marketplace. An exemplary package is sold under the trademark TETRA BRIK of Tetra Laval Holdings & Finance S.A., Pully, Switzerland. Such packages are generally known in the industry and are identified hereinafter as "tetrabrick" type packages.

These materials, which are designed to have great stability in order to prevent contamination of the foods that they will contain, usually liquids, are therefore, undesirably stable when they are converted to urban wastes.

While recovery of the external paper layer is relatively easy, the separation of the plastic and the metal presents serious obstacles, and this makes it difficult to profitably recover these materials or their derivative products.

The applicant is aware of the existence at the present time of Patent of Invention DE 4,305,964 relative to RECYCLING OF COMPONENT MATERIALS, wherein different temperature zones are used in order to provide different gas compositions as fractions, with further processing of the coke residue.

Patent of Invention DE 4,304,294 pertains to an invention intended for the RECOVERY OF USABLE MATERIAL ORIGINATING FROM ALUMINUM-POLYOLEFIN, which is achieved by the removal of cellulose and carbonization of the aluminum below its melting temperature, using the carbonization gas as the heat source.

Patent of Invention number DE 4,410,145 pertains to an invention relative to the CONTINUOUS SEPARATION OF METALIZED PAPER FROM PLASTIC SHEET, by heat treatment and pelletization which provides a clean recovery process, for example, for aluminum and polyethylene.

Patent of Invention EP-484,507 pertains to a PROCESS FOR THE RECOVERY OF ALUMINUM AND POLYETHYLENE FROM METALIZED PACKAGING PAPERS, which includes separation of the printer's ink from the component materials in a separation column.

Patent of Invention EP-538,730 pertains to the RECOVERY OF POLYOLEFIN FROM MULTILAYER FILM, wherein the films or thin layers are cut into small pieces and are subjected to vigorous agitation in a solvent bath, in order to decrease the adhesive joint between the layers.

Patent of Invention EP-448,178 pertains to PROCESSING OF WASTES CONTAINING METALS AND COMBUSTIBLE MATERIALS, which deals with the combustion and cracking of exhaust gases, subsequent washing with acid and alkali and precipitation of the metallic compounds from the washing solution.

Patent of Invention JP 5-345,894 pertains to CHEMICAL RECYCLING OF PLASTIC, which permits high speed decomposition, at low temperature, etc., and includes the thermal decomposition of plastic wastes containing olefin-type and similar plastics in the molten state, and provides a high quality oil or gas in an economic manner.

Patent of Invention EP-629,818 pertains to a METHOD FOR THERMAL CLEANING OF OBJECTS, for example plastic, wherein said objects are heated in an enclosed space until pyrolysis begins, after which the temperature is strictly regulated, using a sensor and reducing or cutting off the supply of air or oxygen.

Patent of Invention EP-501,893 pertains to the REMOVAL OF THE THERMOPLASTIC COATING FROM SUBSTRATES, particularly polyethylene, from aluminum metalized paper, by applying a hot, mobile jet of an inert gas, to melt the coating and to push the molten material to one side.

Patent of Invention KR 89-04,486 pertains to the SEPARATION AND RECOVERY OF POLYETHYLENE AND ALUMINUM FROM RESIN WASTE, which involves the melting of polyethylene, by heating the device, and recovering the aluminum through the space between the ring and the wall of the mobile cylinder.

These patents of invention were located in the WPIL data base, while documents that refer to the dissolution of the polymer were not included in the search.

Within the context of the search previously conducted, the Applicant searched in Chemical Abstracts, and thus became aware of the following documents relative to the decomposition of polyethylene in an inert atmosphere. Namely:

T. Morimoto—J. Appl. Sci. 20, published the existence of a "Composition of the gaseous products of polymer combustion", through which it is known that the presence of methane, ethylene, acetylene and benzene has been detected in the thermal decompositions of commercial polypropylene in a nitrogen stream at 700° C.

J. Michal, in Fire and Matls, 1, describes the "Toxicity of the thermal degradation products of polyethylene and polypropylene" in which decomposition at 400° C. in a helium atmosphere was investigated, finding up to 48 different compounds, among which the most important are alkanes and 1-alkenes with 3 to 18 carbon atoms and small amounts of aromatic substances, such as benzene, toluene and ethylbenzene.

A. Hoff published an article on the "Degradation products of plastics", in which he stated that he had found that the compounds formed depend to a great extent on the raw material used. Twenty-five products were determined at 360° C. in a helium atmosphere, in which hydrocarbons with 4 carbon atoms predominated.

In the publication by T. Morikawa relative to the "Evolution of soot and aromatic hydrocarbons of cyclic fold proceeding from the combustion and pyrolysis of polymers and low molecular weight hydrocarbons", the evolution of the production of polycyclic aromatic hydrocarbons had been studied, according to which, up to 1 g/g of benzo(a) pyrene is found as the decomposition temperature increases between 900 and 1000° C.

From the same source of information and relative to the treatment of formed plastic products, the publication by M. Yoshida relative to the "Treatment of waste rubber and plastics", the plastic is mixed with a white inorganic filler, such as talc, melts and decomposes at a temperature that varies between 400 and 450° C., and is distilled at a temperature that varies between 300 and 350° C., to obtain three colorless fractions, specifically 10% light, 60% medium and 30% heavy.

A publication by T. Takahatake pertains to the "Treatment of synthetic polymer wastes" in which the polymer is mixed with powdered $CaCO_3$ and subjected to dry distillation at a temperature that varies between 250 and 750° C., and the fixed part mixed with the $CaCO_3$ is calcined at a temperature that varies between 1000 and 1200° C., and the CaO is mixed with water to purify the gases.

In the study by R. Kawabata relative to the "Formation of oils from thermoplastic resins", an oil is prepared by polyethylene pyrolysis at 420° C. for 60 minutes, in the presence of a clay containing "alofan", and the presence of approximately 5% clay increases the production of oil from 12.8% to 84.4%.

The study by H. Ito et al. pertains to a "Treatment for polymer wastes or residues", wherein the polyethylene is first treated with a solvent to eliminate the solid by filtration, and after the solvent has been separated and recycled, pyrolysis is carried out to produce gaseous hydrocarbons and oil, which are recycled to the pyrolysis.

The study by S. Komiya pertains to the "Production of gases and oils from waste plastics", wherein the polyethylene passes from a hopper to a rotary cylinder, the surface of which is at a temperature that varies between 200 and 600° C., to obtain a gas and an oil.

The study by K. Nagaya pertains to the use of "Pyrolysis of plastic trim for the production of combustible gases", wherein pyrolysis takes place at over 500° C., and part of the residue |is used| in a high-temperature zone, wherein the temperature reaches 700 to 1200° C., which is reached by burning another part of the residue with oxygen or air in the presence of steam. At 945° C., the gas contains $H_2O$, $CH_4$, $C_2H_6$, and 32 percent other saturated hydrocarbons, 12% $C_3H_6$ and 12% other unsaturated hydrocarbons, 10% $CO_2$, 14% CO, and 2% other gases.

The study conducted by H. Nishizaki pertains to a "Treatment of polyolefin residues" wherein the polyolefins are decomposed by contact in a fluidized medium at a temperature that varies between 650 and 850° C. to recover the olefins.

The publication by Y. Nozaki pertains to a study relative to "Pyrolysis oils obtained from thermal cracking of thermoplastic polymeric materials", wherein some formulas are presented to implement the cracking of the oils obtained by pyrolysis of plastics, in order to obtain, by heating at 310° C. for a period that varies between 4 and 5 hours, an oil that has a flash point of 45 degrees.

S. Hattori refers to the "Thermal decomposition of waste plastics", wherein the plastic is heated in the presence of a metal or a metallic compound (NiO) at 800° C., giving rise to a gas that contains 71 parts of H, 100 parts of $CH_4$, 19 parts of $C_2H_4$, 258 parts of CO and 9 parts of $CO_2$.

In regard to acyclic compounds, the following documents were obtained from the same source as the aforementioned. Namely:

Patent of Invention GB 1,369,964, pertaining to the CONTINUOUS THERMAL DECOMPOSITION OF SYNTHETIC MACROMOLECULAR MATERIALS, which describes a device for the recovery of volatile products from the thermal degradation of polymers, by passing them through a tubular screw extruder, which has orifices for discharging the volatile products to a condenser, the tube being heated to 500° C. to obtain 96.7 wt. % of a liquid product that contains 74.5% by weight of styrene, combined with PhMe dimers and trimers, $C_6H_6$ and α-methylstyrene.

Patent of Invention JP 50-092,373 relative to the THERMAL DECOMPOSITION OF WASTE THERMOPLASTIC RESINS, wherein the thermoplastic resin decomposes on an aluminum bronze alloy surface, <12% Al, and more than 10% of metals from groups II–VIII of the 4 th period, in the presence of steam, while the metallic roller is maintained at 450° C.

Patent of Invention JP 50-115,282 pertains to the PRODUCTION OF FUEL BY THERMAL DECOMPOSITION OF PLASTIC, wherein the plastic is mixed with a lubricating oil to obtain fuels, specifically 227 grams of crushed polyethylene and 308 grams of oils, which are mixed and heated to 410° C. to obtain 500 grams of fuel oil.

Patent of Invention JP 50-097,674 pertains to the GASIFICATION OF WASTE POLYETHYLENIC MATERIALS BY MEANS OF PYROLYSIS WITH ALLOYS, wherein the polyethylene is placed on a sheet of nickel steel, heated to 450° C., with a thermal contribution of 0.03–0.29 cal/sec-cm-deg, which gasifies the polyethylene within 2 minutes, using a sample of 3 grams.

Patent of Invention JP 50–032,108 pertains to the existence of a DEVICE FOR THE PYROLYSIS OF HIGH-GRADE SYNTHETIC POLYMERS, wherein pyrolysis takes place in a double screw conveyor, in which the separation between the coil and the wall provides a space that is certain to prevent the adherence of the pyrolyzate to the wall, and pyrolysis is carried out at a temperature of 560° C. to obtain 8% gas, 67% oil, and 25% wax.

Patent of Invention JP 58–172,322 pertains to the RECOVERY OF ALKYLBENZENE RESIDUES FROM POLYOLEFIN AND BENZENE PLASTICS by decomposing the polyethylene in an autoclave heated to 430° C. with a solid acid catalyst, such as silica-alumina, at a pressure of 70 kg/cm², and after cooling, a liquid product is obtained that contains 20% iso-$PrC_6H_5$, 13% sec- and iso-butylbenzene, 12% $EtC_6H_5$, 10% toluene and 5% $PrC_4H_5$.

Patent of Invention DE 2,623,331 pertains to the LOW-TEMPERATURE PYROLYSIS OF POLYOLEFINS TO PRODUCE GASEOUS AND LIQUID HYDROCARBONS, wherein pyrolysis takes place at low temperature, that is, at 200° C., i.e., the polypropylene is mixed with 9% $AlCl_3$, to obtain approximately 19% gaseous hydrocarbons and 77% hydrocarbons with a boiling point that varies between 20 and 185° C.

Patent of Invention HU 37,587, pertaining to HYDROCARBONS CONTAINING ALPHA OLEFINS FOR INTERMEDIATE INDUSTRIAL PRODUCTS FROM WASTE MATERIALS, in which an agitated reactor is used, and heated to 415° C., to produce 3% of a gas and 97% of a liquid that contains approximately 2% coke.

Patent of Invention CS 219,595 relative to LINEAR ALKANES AND ALKENES, pertains to catalyzing the decomposition with $TiO_2$, to produce linear alkanes and alkenes.

Patent of Invention JP 4-356,433 pertains to the PREPARATION OF METHANOL FROM ORGANIC RESIDUES, to obtain methanol by thermal decomposition of the plastic at a temperature that varies between 400 and 1200° C., by introducing a gas containing oxygen and steam at a pressure of 10 atm., subsequently washing the gas at the discharge, and passing it through a column containing $CaO$—$ZnO$—$Al_2O_3$ at 230° C. and 40 atm.

Patent of Invention U.S. Pat. No. 5,326,919 pertains to the RECOVERY OF MONOMERS BY MEANS OF THE PYROLYSIS OF POLYMERIC MATERIALS, to obtain monomers with a low content of coal tars and coke by heating the polymer at 500° C./second by contact with incandescent sand.

From the same source as the aforementioned inventions, but relative to heterocyclic compounds, a Patent of Invention WO 92-22,528 has been found relative to a PROCESS FOR CONTROLLED CATALYTIC AND SEQUENTIAL PYROLYSIS AND HYDROLYSIS OF MIXED POLYMER RESIDUES, wherein rapid pyrolysis takes place, which is catalyzed by acids or bases to convert the plastic to monomers and other valuable products in a sequential path without the necessity of cutting up the plastic beforehand, with pyrolysis taking place at a notably high temperature.

From the same source of information, but relative to macromolecular compounds obtained by reactions that involve only unsaturated carbon-carbon bonds, the following documents have been found. Namely:

Patent of Invention GB 2,136,437 pertains to a PROCESS AND EQUIPMENT FOR MANUFACTURING SIMILAR SUBSTANCES OR PARAFFINIC WAXES, wherein the material is burned to initiate pyrolysis, and the melted product decomposes to form a substance analogous to a paraffinic wax, which can be used as a fuel, for melted wax casting, in polishing, etc., and the combustible gas from pyrolysis is burned to produce the heat necessary for the process, while the device used to prepare the wax product is configured from a combustion basket with the upper part and the bottom open, and a small perforated basket located above the receptacle that receives the molten material.

Patent of Invention RO 71,349 pertains to the RECOVERY OF STYRENE FROM POLYMER RESIDUES, wherein approximately 70% of the styrene is recovered by means of thermal decomposition at a temperature that varies between 200 and 500° C. in the presence of an asbestos catalyst with a CuO support.

Patent of Invention JP 53-055,384 pertains to TREATMENT OF PYROLYSIS PRODUCTS FROM POLYMERIC RESIDUES, which includes a vapor phase in which the polyethylene is combined with the wax residue that is produced by pyrolysis to obtain a liquid product.

Patent of Invention EP 502,618 pertains to the THERMAL DEGRADATION OF POLYMERS IN FLUIDIZED BEDS, in the preparation of low molecular weight hydrocarbons, such as light olefins, paraffins, naphthalenes, olefinic oligomers and waxes, by thermal degradation in a fluidized bed at a temperature that varies between 300 and 690° C.

Patent of Invention GB 1,450,285 pertains to a PROCESS FOR THE PRODUCTION OF WAX, wherein waxes that can be used for polishing are produced by polyethylene pyrolysis below 350° C., to obtain seven parts of soft grease products, with a pungent odor that melt between 70 and 82° C., and 111 parts of a colorless, odorless wax residue that melts at a temperature between 90 and 100° C.

Patent of Invention JP 5-214,022 pertains to a PROCESS FOR THE THERMAL DECOMPOSITION OF POLYOLEFIN RESIDUES, wherein the polyolefins decompose at a temperature that varies between 250 and 500° C. to obtain waxes, oils, gases, etc., in a reactor that contains a catalyst placed on a screen.

Also from the same source as the previous groups, but relative to post-treatment production processes, the following information has been obtained. Namely:

Patent of Invention DE 3,037,029 pertaining to MODIFIED TARS AND AROMATIC PRODUCTS WITH A LOW BOILING POINT AND OLEFINS AND THE USE OF THESE TARS, wherein the polyethylene is mixed with aromatic hydrocarbons with a boiling point below 300° C., such as anthracene oil or carbonaceous coal tar, in an inert atmosphere to prepare olefins with a low boiling point, as well as modified tars that are used to prepare coke, and a mixture of equal parts of coal tar and polyethylene heated to 370° C. for 5 hours in an inert atmosphere, resulting in the production of 29% volatile products, including 1% benzene, 26% toluene, 53% ethylbenzene, 18% cumene and 2% other hydrocarbons.

The residue of 69% is subjected to a softening temperature of 118° C. to obtain 8.6% insoluble quinoline and 37.6% insoluble toluene, and these three products are used to prepare electrodes.

Patent of Invention DD 285,506 relative to the COMPLETE RECOVERY OF POLYMERIC RESIDUES pertains to a process that requires no laborious separation or purification, wherein the plastic is mixed with superheated steam and treated with H plasma at a temperature of 100° C. and 10.05–0.5 MPa during 1 ms to 30 seconds of rapid cooling.

A solid (coke or carbon black) and a gas formed by a mixture of $C_2H_2$, $C_2H_4$ and H are separated from the pyrolyzed stream, and this is washed to separate $C_2H_2$, which is recycled to prepare the polymer.

Patent of Invention JP 53-045,384 relates to PYROLYZATION DEVICES FOR THERMOPLASTIC RESIN RESIDUES, wherein the plastic is decomposed in a pyrolysis tank at 400° C. and the components produced dissolve in a tank at 300° C. from which a distilled fraction is obtained.

Patent of Invention JP 52-049,506 relative to PLASTIC PYROLYSIS pertains to the pyrolyzation of plastic to produce an oil and a gas, recycling the oil with the plastic, and using it as a heating and transfer medium.

Patent of Invention JP 5-186,632, relative to the PRODUCTION OF LIGHT OILS BY MEANS OF HYDROLIQUEFACTION OF WASTE PLASTICS pertains to pulverizing the plastic and mixing it with recycled containers to pyrolyze the mixture in a catalytic reactor at a temperature that varies between 250 and 500° C., and between 10 and 300 atm., using $FeS_2$ as the catalyst, and the liquid effluent is placed in contact with a hydrogenation catalyst (Ni-Mo or Co-Mo) and is distilled to recover light oils.

Patent of Invention RO 102,366 pertains to PYROLYSIS OF MIXTURES OF POLYMERIC RESIDUES, wherein a mixture of tires and polyethylene is pyrolyzed at a temperature that varies between 450 and 600° C., to prevent the formation of coal tars, sulfurated compounds, etc.

The following documents relative to the destructive distillation of carbonaceous materials were obtained from the same source as the previous groups. Namely:

Patent of Invention DE 2,424,605 relative to the PYROLYTIC TREATMENT OF ORGANIC RESIDUES, describes decomposition by heating to a temperature that varies between 750 and 900° C. in the presence of an inert gas of a polyethylene mixture (among others), and a catalyst formed by oxides of heavy metals, such as Ba, Cr, Cu, Pb, Zn, Bi, or Ni, or compounds of Ba, Cr, or Cu, or mixtures thereof (0.05 to 5%), and a peroxide (ketoperoxide, ester peroxide or hydrogen peroxide) (0.15 to 15%).

Patent of Invention RO 78,462 pertains to a CATALYTIC PROCESS IN A DEVICE FOR THE THERMAL DECOMPOSITION OF POLYMERIC RESIDUES, which is implemented by decomposition in a tubular reactor, in which the material is entrained by an endless screw, and passes through three zones heated to temperatures that vary between 20 and 250° C., between 250 and 450° C., and over 450° C.

The pyrolysis product is passed through a cracking catalyst, consisting of approximately 86% SiO2, 13% $Al_2O_3$, 0.12% $Fe_2O3$, and 0.32% $Na_2O$.

Patent of Invention JP 6-080,970 pertains to a TREATMENT OF MACROMOLECULAR MATERIALS, indicating that hydrocarbons and a residue of heavy oils can be obtained by subjecting the plastic to a heat treatment.

Patent of Invention WO 92-04,423 pertains to the RECOVERY OF MONOMERS FROM THE PYROLYSIS OF POLYMERIC RESIDUES, indicating that by heating to over 650° C., specifically between 650 and 1000° C., in a fluidized bed reactor with steam as the carrier element, a gas is formed by 16.4% H, 0.8% $CO_2$, 38.2% ethylene, 3% ethane, 1.2% acetylene, 9% propylene, 3.6% butylene, 27.2% $CH_4$ and 0.6% CO by volume.

Patent of Invention U.S. Pat. No. 3,984,288 pertains to a TREATMENT OF RUBBER AND PLASTIC RESIDUES, describing a reactor with an endless screw extruder, wherein the product is melted at 350° C., and passed to a decomposition zone heated to a temperature that varies between 500 and 800° C., and from there to a distillation zone that varies between 300 and 400° C., to obtain three fractions of products.

Patent of Invention DE 3,247,388 pertains to a PROCESS AND DEVICE FOR OBTAINING USEFUL RAW MATERIALS FROM PLASTICS RESIDUES, wherein the pyrolysis is implemented in a coking oven at a temperature that varies between 900 and 1200° C., with the pyrolysis products being formed by 57 to 59% gases, 37 to 41% liquids, and 2 to 4% solids, including gaseous products H, $CH_4$, $C_2H_4$, $C_2H_6$, $C_3H_6$, $C_6H_6$, PhMe and naphthalene.

Also from the same information source but relative to cracking of hydrocarbon oils, the following documents were found. Namely:

Patent of Invention JP 3-086,791, relative to the PRODUCTION OF LOW BOILING POINT HYDROCARBON OILS, wherein the polyolefins are mixed in a tank and the melted product is pyrolyzed, with the vapors being passed through a zeolite catalyst (HZSM 5), and a fraction of the product is recycled to the mixing tank.

Patent of Invention JP 54-043,278, relative to PARAFFINS AND OLEFINS FROM POLYOLEFIN RESIDUES, wherein the polyolefins decompose at a temperature that varies between 400 and 600° C. in an explosion-proof boiler, air is removed and n-paraffins with from 11 to 20 C and olefins with a molecular weight between 180 and 250 are obtained.

The material reaches the boiler through a horizontal screw conveyor, and the gas formed in the refining zone, the upper part of the boiler, at a temperature that varies between 300 and 360° C. is separated, condensed and recovered, with part of the condensate being returned to the refining zone to maintain the temperature.

Patent of Invention JP 56-045,984 relative to the PYROLYSIS OF POLYOLEFIN PLASTICS, wherein the polyethylene is decomposed at a temperature that varies between 430 and 470° C., and the product is passed through a bed formed by glass beads with a diameter of 6.5 millimeters and a temperature of 250° C. to obtain a hydrocarbon oil.

Patent of Invention JP 6-184,555 relative to THERMAL DECOMPOSITION OF WASTE PLASTICS, wherein the plastic and high temperature steam are introduced into a horizontal decomposition oven, the walls of which are heated from the outside, and the device has a shaft with rotors.

Patent of Invention JP 60-190,494, relative to the PRODUCTION OF SUBSTANCES ANALOGOUS TO PARAFFINIC WAX, wherein the polymer is melted in a perforated basket and drips through the holes in the bottom of the basket onto a bed of wire-form catalyst, where the polymer is pyrolyzed at high temperature, continuously, in an oxygen-poor atmosphere, and the fuel gas produced is returned to the basket where it is burned and the molten paraffin wax is collected in the bottom of the reactor, and is used as fuel or as a filler material.

Patent of Invention JP 60-049,086 relative to a PROCESS AND DEVICE FOR THE PYROLYSIS OF POLYETHYLENE RESIDUES, wherein the vessel in which pyrolysis takes place is heated exteriorly from the outside, at a controlled temperature to prevent overheating and the accumulation of C in the walls.

To this end, $KNO_3$ and $NaNO_3$ sand is used as the heating medium in the jacket that surrounds the vessel, and due to the combustion of gases or oil, the temperature of the medium is maintained and varies between 450 and 600° C., and the temperature in the interior of the vessel is between 400 and 500° C.

The vessel has an agitator, an exhaust for the gas produced, and a discharge valve in the bottom, and the gas produced passes to a second decomposition reactor and is recovered as oil in the condenser.

Patent of Invention JP 4-086,790, relative to the PRODUCTION OF LOW BOILING POINT HYDROCARBON OILS, wherein the polyethylene is melted in a tank, the molten product is pyrolyzed in another tank, and at least a portion of the liquid fraction is separated from the pyrolysis gas by liquefying it, and is recycled to the pyrolysis tank and the tanks are passed through a zeolite catalyst (HZSM 5) for its catalytic conversion.

Patent of Invention JP 53-045,302, relative to HYDROCARBON OILS OBTAINED FROM DEGRADED POLYETHYLENE RESIDUES, wherein the polyethylene is melted at 400° C. in the absence of oxygen, and is thermally decomposed after heating, and a hydrocarbonated oil is obtained after fractionation.

Patent of Invention JP 4-180,995, relative to the PRODUCTION OF AROMATIC HYDROCARBON OILS BY PYROLYSIS OF POLYOLEFINIC PLASTIC RESIDUES, wherein aromatic hydrocarbons are obtained by pyrolyzing the olefinic plastics, and the vapors produced are passed through a zeolite catalyst bed (HZSM-5) at a temperature that varies between 350 and 550° C., the effluent obtained is cooled to separate the volatile hydrocarbonated gases from the low boiling point hydrocarbonated oils, and finally the hydrocarbonated gases are heated and introduced into the catalytic bed, to obtain contact conversion.

Patent of Invention WO 94-20,590, relative to a PROCESS FOR RECYCLING WASTE PLASTICS, wherein the plastic is decomposed in a diluent, such as hot oil by means of actions that give rise to free radical precursors at low temperature, such as vinyl chloride or polyurethane and thermal decomposition takes place at 375° C. and the diluent can be recycled to the process.

Patent of Invention JP 5-171,159, relative to a DEVICE FOR THE TREATMENT OF WASTE PLASTICS BY PYROLYSIS, wherein the plastic is subjected to dry distillation in an oven, and the gaseous effluent is condensed to yield a product similar to wax that melts between 40 and 100° C., which can be used as a heat accumulating material, comprising the system for storing this material in a storage tank and the utilization of its accumulated energy by the dry distillation oven; the cost of constructing the device is low and energy consumption is reduced.

Patent of Invention EP 555,833, relative to a PROCESS AND A DEVICE FOR PRODUCING A LOW BOILING POINT HYDROCARBON OIL FROM PLASTIC RESIDUES OR RUBBER RESIDUES, wherein the plastic is thermally decomposed to produce a vapor that is placed in contact with an acid catalyst containing HCl as a decomposition activator for cracking the gaseous products, thus producing a hydrocarbonated oil with a low boiling point.

Patent of Invention JP 55-071,789, relative to PYROLYSIS OF POLYOLEFINIC PLASTICS RESIDUES, wherein the plastic is pyrolyzed to recover oligomers and hydrocarbonated oils.

The desired product is obtained by controlling the pyrolysis temperature between 350 and 470° C., and that of the gaseous phase above the material to be pyrolyzed, which can vary between 110 and 470° C., and when these temperatures are at 420 and 300° C., respectively, after 5 hours, 91.2% of a hydrocarbon with a greasy appearance is recovered (average m.p. 287, with 73% hydrocarbons with 5 to 33 C).

Patent of Invention DE 4,114,434, relative to REDUCED PRESSURE PYROLYSIS OF SYNTHETIC ORGANIC WASTES, ESPECIALLY WASTE PLASTICS, WITH MINIMUM FORMATION OF COKE, wherein pyrolysis is carried out at a temperature that varies between 220 and 350° C. and at a pressure between 10 mb and 1 bar to minimize the formation of coke, and pyrolysis can take place in the presence of additives (phenols, sulfurated compounds, alkane, amines and water), a radical initiator (ter-BuOOH) or hydrocarbonated oils.

Patent of Invention JP 6-128,569, relative to a PROCESS AND A DEVICE FOR THE FORMATION OF HYDROCARBONATED OILS WITH A LOW BOILING POINT, wherein oils are obtained starting from those with low boiling point, which are useful as a raw material for gasolines, by being passed through an extruder, a mixing tank of the molten product and a tank with a zeolite catalyst, and a portion of the molten material from the pyrolysis tank is recycled to the extruder.

Patent of Invention JP 6-228,568, relative to a PROCESS AND A DEVICE FOR OBTAINING HYDROCARBONATED OILS FROM PLASTIC RESIDUES OR FROM RUBBER RESIDUES, wherein a gas is obtained by pyrolysis, and a product with a low boiling point is obtained by cracking the gas, and the catalyst used for cracking is a transition metal with a particle size of less than 0.1 μm.

Patent of Invention JP 5-279,671, relative to a TREATMENT OF WASTE PLASTIC BY MEANS OF PYROLYSIS, USING RADIATION, wherein for pyrolysis, the plastic is subjected to beta or gamma radiation at approximately 300° C. in an inert atmosphere of H, steam or air, and depending on which gas is used, a specific ratio of gas to liquid is obtained in the product obtained.

Patent of Invention JP 6-279,762, relative to RECOVERY OF FUEL-OIL FROM THE TREATMENT OF INDUSTRIAL WASTES, CONTAINING POLYOLEFINS BY MEANS OF PYROLYSIS, wherein the polyolefin is treated with steam at a supercritical temperature in a pressure vessel, to obtain an oily substance of low-viscosity oils.

Patent of Invention JP 5-059,372, relative to the PRODUCTION OF FUEL-OIL FROM POLYOLEFINIC RESINS, wherein a fuel oil is obtained (gasoline with a high content of aromatic substances), by catalytic conversion of the products of pyrolysis at a temperature that varies between 300 and 550° C., with the conversion taking place by passing the vapors through a bed of REY zeolite at a temperature that varies between 200 and 600° C.

Patent of Invention CS 275,924, relative to the PRODUCTION OF LOW MOLECULAR WEIGHT ALKENES BY COPYROLYSIS OF PETROLEUM FRACTIONS, wherein pyrolysis is achieved with gasoline, kerosene or gas-oil with 3–30 wt. % of polyethylene in the presence of steam at a temperature that varies between 600 and 900° C., as well as a charging steam ratio of 1 to 2, a residence time of 0.16 seconds, and a temperature of 820° C., which yields a product that contains 1.0% H, 16. 1% methane, 4.2% ethane, 31.3% ethylene, 15.4% propylene, 4.7% 1,3-butadiene, and 27.3% of other products by weight.

Patent of Invention JP 53-034,232, relative to THERMAL DECOMPOSITION OF PLASTICS RESIDUES, wherein thermal decomposition takes place in the presence of Ni at a reduced pressure, so that 130 grams of heated polyethylene in a stainless-steel vessel in the presence of Ni at 500° C. and 500 torr yields 120 grams of oil, 7.5 grams of gases and 2.6 grams of residue.

Patent of Invention JP 5-279,673, relative to a DEVICE FOR THE RECOVERY OF FUEL-OIL FROM THE TREATMENT OF WASTE FOAMED PLASTICS, wherein the plastic is melted with an organic solvent to improve fusion in a closed vessel, the mixture is pyrolyzed and the fraction is evaporated, by passing it through a catalytic reactor.

Patent of Invention JP 59-124,992, relative to the RECOVERY OF SPENT POLYMERS AS FUELS, wherein the polymer is fed into the bottom of a reactor vessel, containing a molten metal, at a temperature of least 250° C., which produces pyrolysis of the plastic and the gaseous product that is prepared is cooled, and a gaseous fraction and a liquid fraction are separated, using molten lead at 500° C., from 86 grams of polyethylene, to obtain 65 grams of a liquid fraction and 20.1 L of a gaseous fraction which is used as a fuel; it should be pointed out that this Patent of Invention was obtained from the same sources as the previous ones, and refers to the area of the production of gasogenic gas, water gas, or synthesis gas.

Finally, the applicant also obtained the following two patents of invention from the same sources as the previous patents, but they are related to fuels not provided for in other places. Namely:

Patent of Invention WO 93-09,207, relative to a PROCESS FOR THE TREATMENT AND DESTRUCTION OF DOMESTIC AND/OR INDUSTRIAL WASTES AND FUEL PRODUCED FROM SAID WASTES, wherein different residues are mixed with polyethylene, to obtain, after they are melted, a product with a heating power of 13.5–16.5 mg/kg.

Patent of Invention JP 56-122,894, relative to a FUEL FROM PLASTICS RESIDUES, wherein the plastic is pelletized with lime or limestone, and the mixture is pyrolyzed at 200° C. (the CaO stabilizes the HCl when PVC is used) to produce a combustible gas.

In accordance with the information received, the applicant has no knowledge of the existence at the present time of a Patent of Invention relative to a method, device or process that permits the recovery of the outer layer of paper that covers "tetrabrick type" packages, thus permitting the separation of the plastic and the metal; this operation involves many problems, which make it impossible, or at least extremely difficult, to achieve a profitable recovery of the latter or of products derived therefrom.

In spite of the existence of an extensive bibliography in this regard, the processes described are based on direct heating, which is considered a disadvantage when a readily reactionable element such as aluminum is present, or indirect heating through a cylindrical housing, and the entrained product is moved through its interior by means of an endless screw.

DESCRIPTION OF THE INVENTION

The process for the recovery of aluminum and energy from used "tetrabrick" type packages and an oven for implementing it, which are the subjects of the invention, include a first step (which is not the subject of this invention), for the recovery of its outer paper wrapper.

In a second step, which is the subject of this invention, the recovery of the rest of the package (approximately 25% of its initial weight) takes place; this product is formed basically of an aluminum sandwich between two layers of polyethylene, which are separated by thermal decomposition; in this way, some hydrocarbons are obtained, which, through combustion, are used to generate thermal energy and metallic aluminum, and due to its purity, is a highly valuable element.

This invention is illustrated by the block diagram shown in FIG. 3, wherein the blocks with dotted lines refer to the first part of the process (not claimed).

The principal part of this invention is the oven, which is used to produce pyrolysis by indirect heating by combustion gases; and this oven, unlike all of the ones described in the documents cited above as State of the Art background, is configured like a hearth oven, also called multiple hearths, which are widely used in roasting ores; it consists of a series of circular trays, forming hearths, into which the feed is charged through the upper hearth, and descends from one to another, impelled by arms that start from a central revolving shaft.

In the case of this invention, the hearths and walls are metallic (preferably made of refractory steel) and they have a jacket through which heating gases circulate and their heat is transferred through the metal to the material that is supplied, in this case, the aluminum recovered from the polyethylene.

FIG. 4 illustrates the background of the invention and shows a Utility Model registered in Spain with the number 94-02,456, a first version, in which the trays where the molten polyethylene is held are somewhat concave, while the layers of aluminum fall through orifices that connect each tray with the one below, and are removed to the outside from the last one by means of an endless screw.

Although in practice, this system made it possible to obtain a good yield and production from polyethylene pyrolysis, it had the disadvantage that the aluminum was not sufficiently cleansed of the polymer and that the pyrolysis gases were difficult to control.

The modifications that have been made mean that the new oven can be considered completely novel compared to the previous one, which justifies its being presented as a novel and different equipment and process, which can be seen by comparing FIG. 4 with FIG. 6, which refers to the oven that is the subject of this invention.

In FIG. 4, the non-volatilized products of the pyrolysis accompany the aluminum through its descent through the oven, while in FIG. 5, it can be seen that those products are separated continuously from the aluminum and are collected in an appropriate container.

The oven is supplied from a hopper by means of an endless screw which discharges into a cylindrical shell (3), in the interior of which is a series of cylinders or trays with a greater diameter than height, the lower cover of which is preferably flat, and the upper concave, preferably in the form of an inverted cone, and in the center of these trays there is a cylindrical orifice (22) with a diameter that is slightly larger than that of the shaft, through which drains, by force of gravity, the undistilled oil formed during the pyrolysis, while the aluminum sheets (covered with polymer or not), fall to the tray below through a groove d, which is preferably trapezoidal in shape; these grooves are angularly offset with respect to the one above by approximately 30°, although in the drawing represented in FIG. 6, they are located at 180° to make it easier to understand, that is, diametrically opposite, so that when the product falls onto one tray, before descending to the following one, it must travel over its entire surface.

A combustion gas circulates through the inner part of each tray (cylinder), heating its surface, and the heat is transferred to the aluminum sheets that are recovered from the polymers.

The heating gas passes from one tray to another through a connecting flue stack, the shape of which depends on the construction requirements, and in the case where it is cylindrical, it will preferably be diametrically opposite from one tray to another so that the gases travel over the entire surface to be heated.

The gas which is entrained by a stream of vapors impelled by the blower leaves the collecting tube and the uncondensable fraction is carried to a burner where its energy is utilized.

Diametrically opposite the discharge opening of the bottom tray, there is a sealed container in the bottom of which the shaft is supported by a bearing through the surface of which run the non-volatile oils formed by pyrolysis of the polymer.

Said oil is collected in this sealed container, such that, in the presence of a suitable catalyst it can be fractionated into lighter molecules, for example, as claimed in German patent DE 2,623,331; the addition of 9% aluminum chloride to these oils yields a product with a boiling point below 200° C., and in this way, the oil can be volatilized, or even used for other purposes.

The downward movement of the aluminum sheets is achieved by rakes hanging from arms that are integral with the revolving shaft.

The aluminum in the final tray, which has lost practically all of the polymer, is collected in the bottom of the oven and by means of an endless screw, whose pitch is shortened in the final phase, and is extracted from the oven.

DESCRIPTION OF THE DRAWINGS

To supplement the description and for the purpose of contributing to a better comprehension of the characteristics of the invention, this description is accompanied by a set of drawings, which are an integral part of the description, and which are non-limiting illustrations of the following.

Finally.

PREFERRED EMBODIMENT OF THE INVENTION

Figure 1:
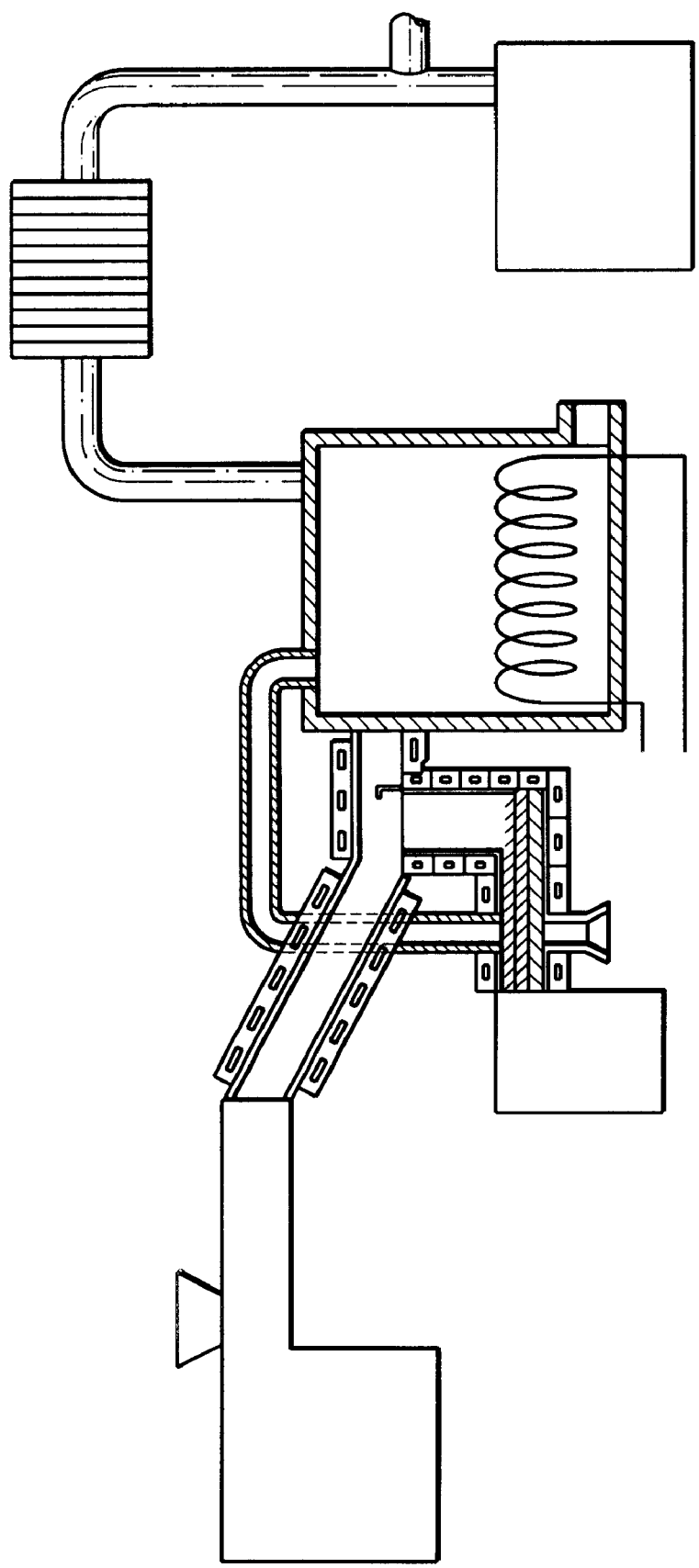
FIG. 1 is a diagram of the oven described by Yoshida in U.S. Pat. No. 3,984,288.
Figure 2:
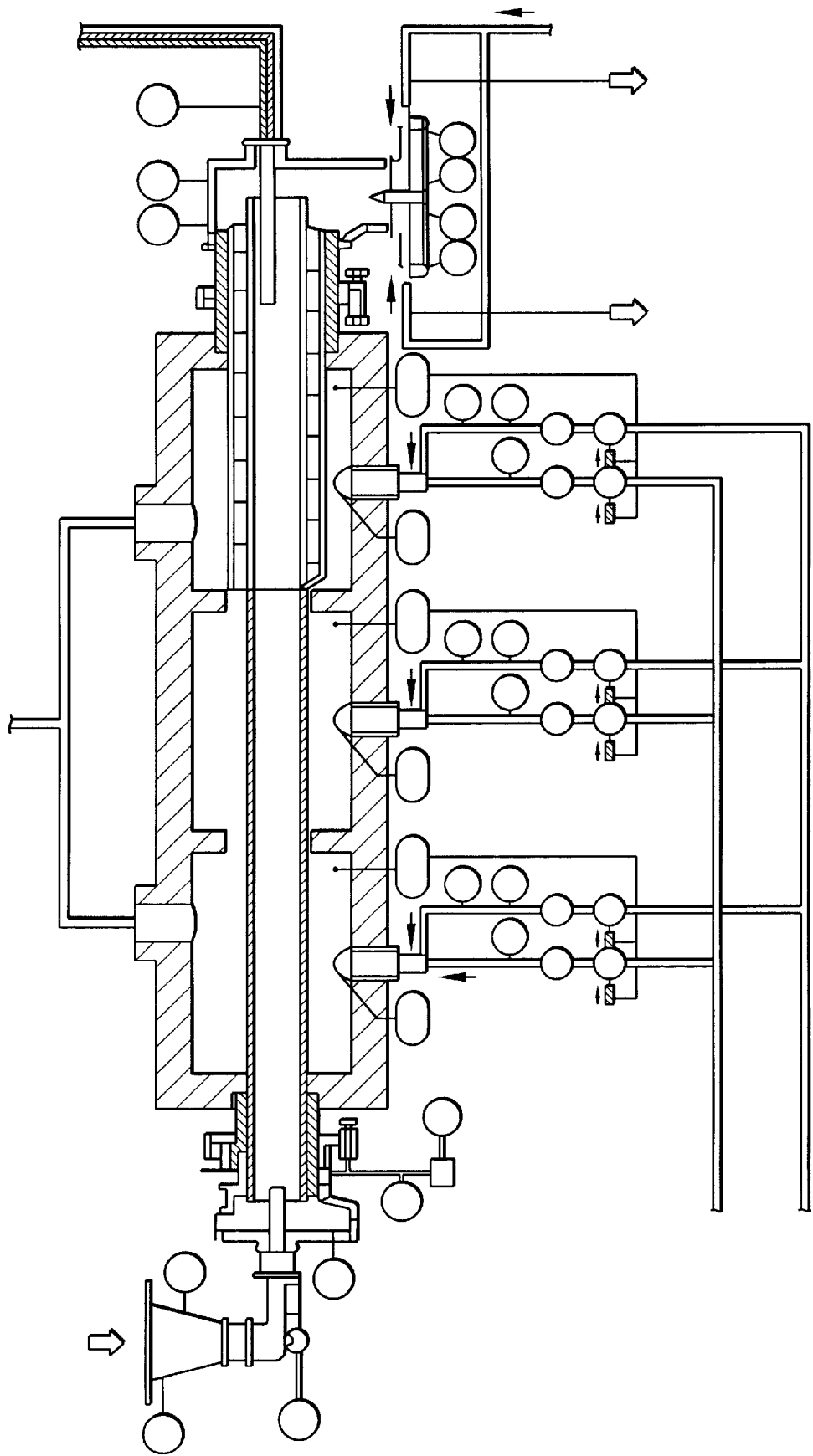
FIG. 2 is a diagram of the oven described by Strepp in DE patent 4,304,294.
Figure 3:
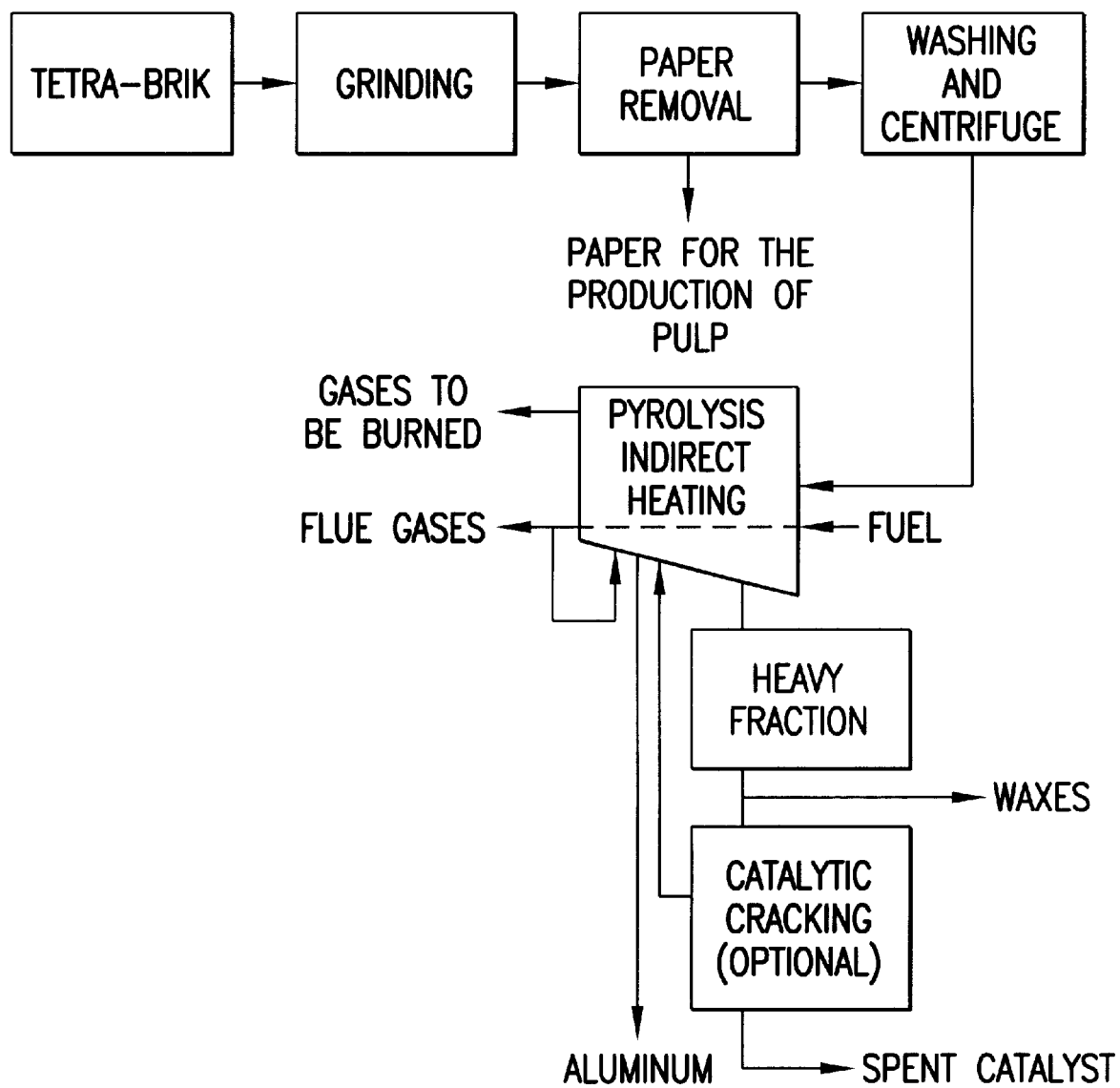
FIG. 3 is a block diagram of the process protected by this invention relative to a process for the recovery of aluminum and energy from used "tetrabrick" type packages, and an oven for implementing it, it being specified that the blocks marked with broken lines represent the preliminary process of removing the paper, which is not included in this invention.
Figure 4:
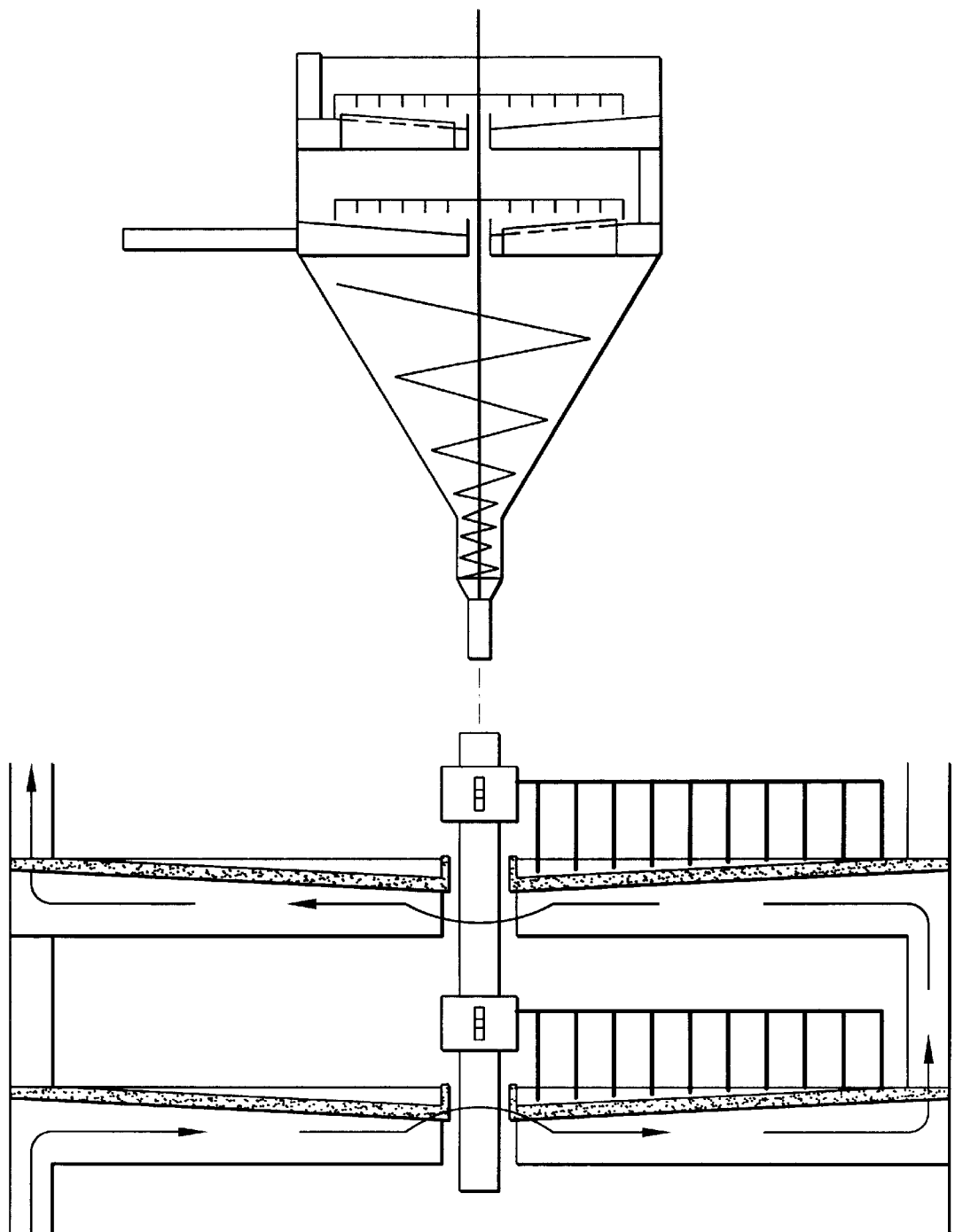
FIG. 4 is a schematic view of a previous version of the oven, which is the property of the applicant, and an application was filed in Spain at the proper time for a utility model with number 94-02,456, in which basically, the products of pyrolysis are held in each tray until they are volatilized, and when this is not entirely possible, the aluminum obtained is discharged mixed with these products.

It can be observed from the figures that the process for the recovery of aluminum and energy from used "tetrabrick" type packages and an oven for implementing it, is configured as a process for treating "tetrabrick" type packages from which the paper has previously been recovered.

By means of this process, aluminum is separated on the one hand, and polyethylene on the other hand, in the form of small molecules that can be temporized (medium and light fraction) or condensed in the form of a solid product (heavy fraction).

Due to its energy content, the volatile fraction is used for heat in an oven; this does not create any pollution problems since these are aliphatic and aromatic hydrocarbons and no other elements are present (essentially halogens).

The heavy fraction can be used as is (the product is similar to a wax and it has similar applications), or even in the same process, and in this case, appropriate catalysts are used, while the molecules are fractionated into other smaller ones to yield a greater or lesser proportion of a volatile product that can be burned.

All of the C—C bonds of the polyethylene have the same energy, except of course, the terminal carbons of the chain or secondary or tertiary carbons, where branches are produced.

Thermal decomposition, in the absence of oxidants, takes place by splitting at random, and this produces, principally a mixture of paraffinic and olefinic hydrocarbons of different chain lengths, combined with a small amount (on the order of 5%) of non-aliphatic hydrocarbons, while the majority are aromatic; among them should be noted, in order of abundance, benzene, ethylbenzene and toluene, as well as some cyclic chain hydrocarbons, such as ethylcyclopentene.

The aliphatic hydrocarbons that are produced have at least three carbon atoms and almost 85% of them have chains that include between 3 and 18 carbon atoms, leaving approximately 10% of the decomposition products with more than 18 carbon atoms.

The majority of the products formed are, therefore, a mixture of compounds with the formulas:

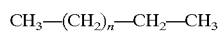
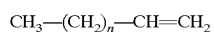

where n is between 2 and 10.

The limit of this group (n=10) is represented by 1-tridecene and n-tridecane, whose boiling points are 232° C. and 235° C., with melting points of −13° C. and −6° C. It is understood that by maintaining a reasonable heat resistance in the discharge collector, these compounds can easily be conveyed to a gas burner to take advantage of their non-conducting insulating energy.

The second very important fraction, which goes up to n-octodecane has a boiling point of 316° C. and a melting point of 22° C.; in accordance with which, this fraction, which can condense totally or partially during conduction, remains liquid under normal conditions; therefore, by means of a suitable piping, it can easily be collected in a tank for subsequent treatment.

Finally, long-chain hydrocarbons, which can involve up to 10% of the total products decomposed, have high boiling points, but not high melting points, and therefore, they can give rise to solid products at ambient temperatures, but with appropriate heat insulation, within the oven, they yield liquid products that are easily manageable, and when they are collected within the same oven, as stated, they can be subjected to catalytic cracking (breaking) or stored for further marketing.

The process that is the subject of the invention is based on these considerations, and it consists of pyrolysis by indirect heating of the polymer-coated aluminum sheets such that:

a) by using an inert gas (which can be the smoke from combustion) for the entrainment of the vapors, the volatile fraction is easily separated.

b) by allowing the liquid fraction formed to flow, it is separated from the aluminum which is more or less coated with polymer, without decomposing, and c) by separating the aforementioned products, and by continuous heating of the polymer coated aluminum, total pyrolysis of the polyethylene takes place, so that the aluminum obtained is practically pure.

The process that is the subject of this invention starts with the polymer-coated aluminum sheets that remain as a by-product of a process of separating the cellulose part (paper) from the tetrabrick.

The treatment of this by-product is claimed herein, by passing it through a chamber whose walls are at a temperature between 200° C. and the melting point of aluminum (660° C.), and preferably between 300° C. and 500° C.

The lower level of the chamber is inclined to collect the heavy fraction from the polyethylene pyrolysis, and the light fraction is carried through the use of an inert gas, preferably combustion gases, to a collector for use as a fuel, and in this way, the trajectory is long enough for the product flow (aluminum+polyethylene) to be managed so that an aluminum that is practically free of polyethylene is left at the end.

This invention also claims an oven that permits the process to be carried out in a simple manner.

Figure 8:
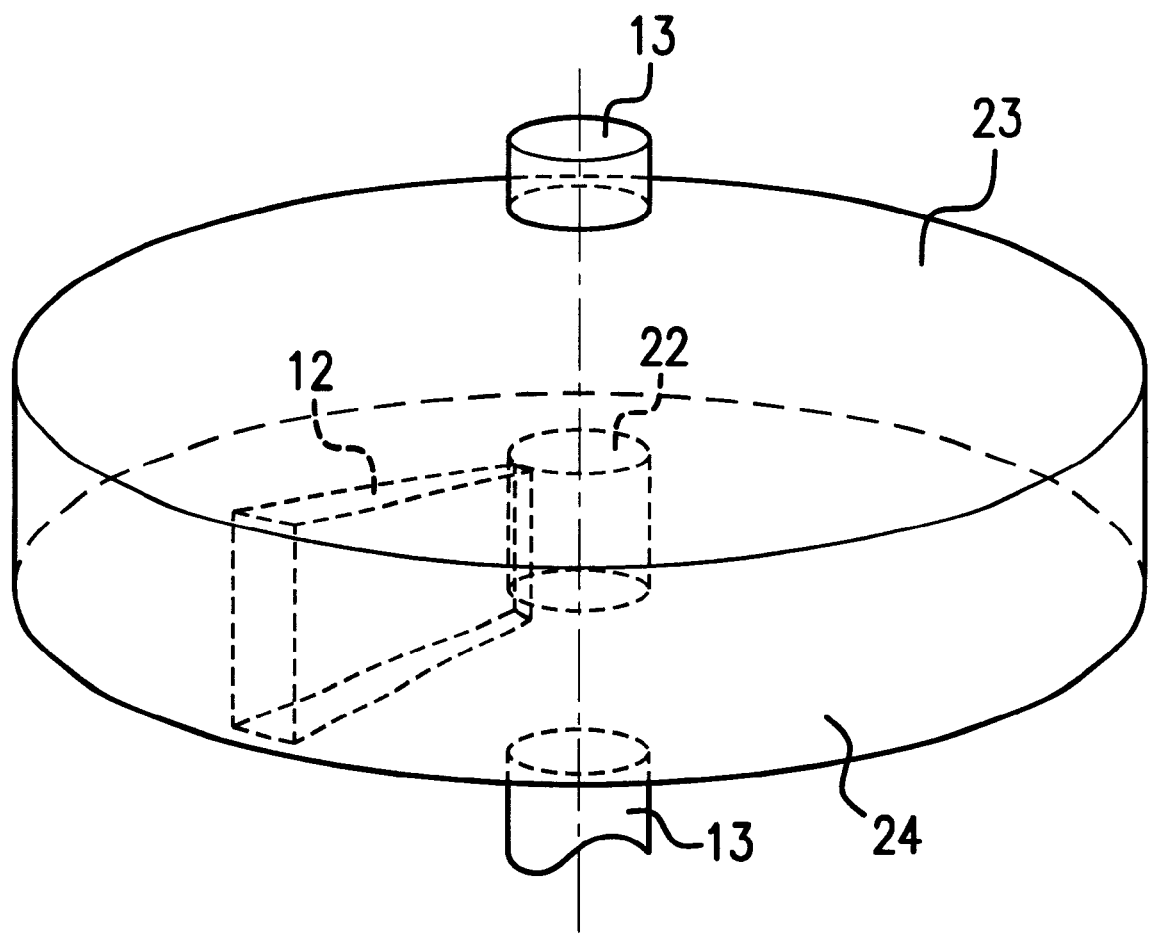
FIG. 8 is a three-dimensional diagram of a tray.

The oven is constructed of a series of trays as shown in FIG. 8, which are formed by a cylinder with a larger diameter than height that is closed at the bottom and at the top.

The upper surface (23), through which the product to be treated moves, is concave, preferably in the form of an inverted cone, in the apex of which an opening (22) has been drilled, passing through the lower surface (24), which is closed by means of a cylinder.

Figure 6:
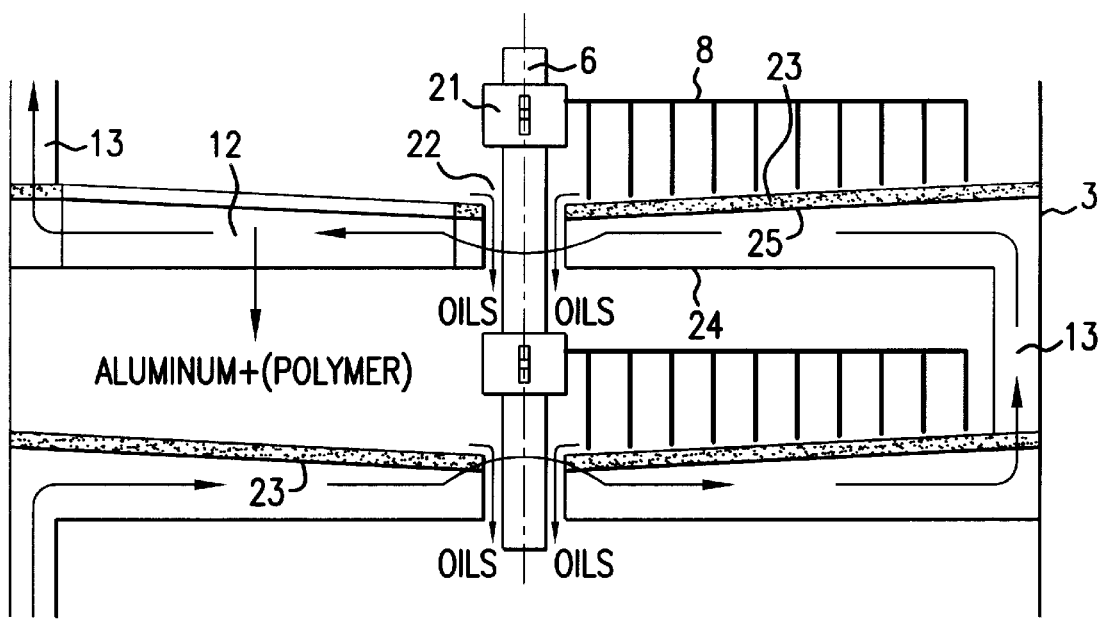
FIG. 6 shows the plates or trays in detail (the thin arrows indicate the flow of the heating gases and the thick arrows indicate the flow of the product and the oil).
Figure 6:
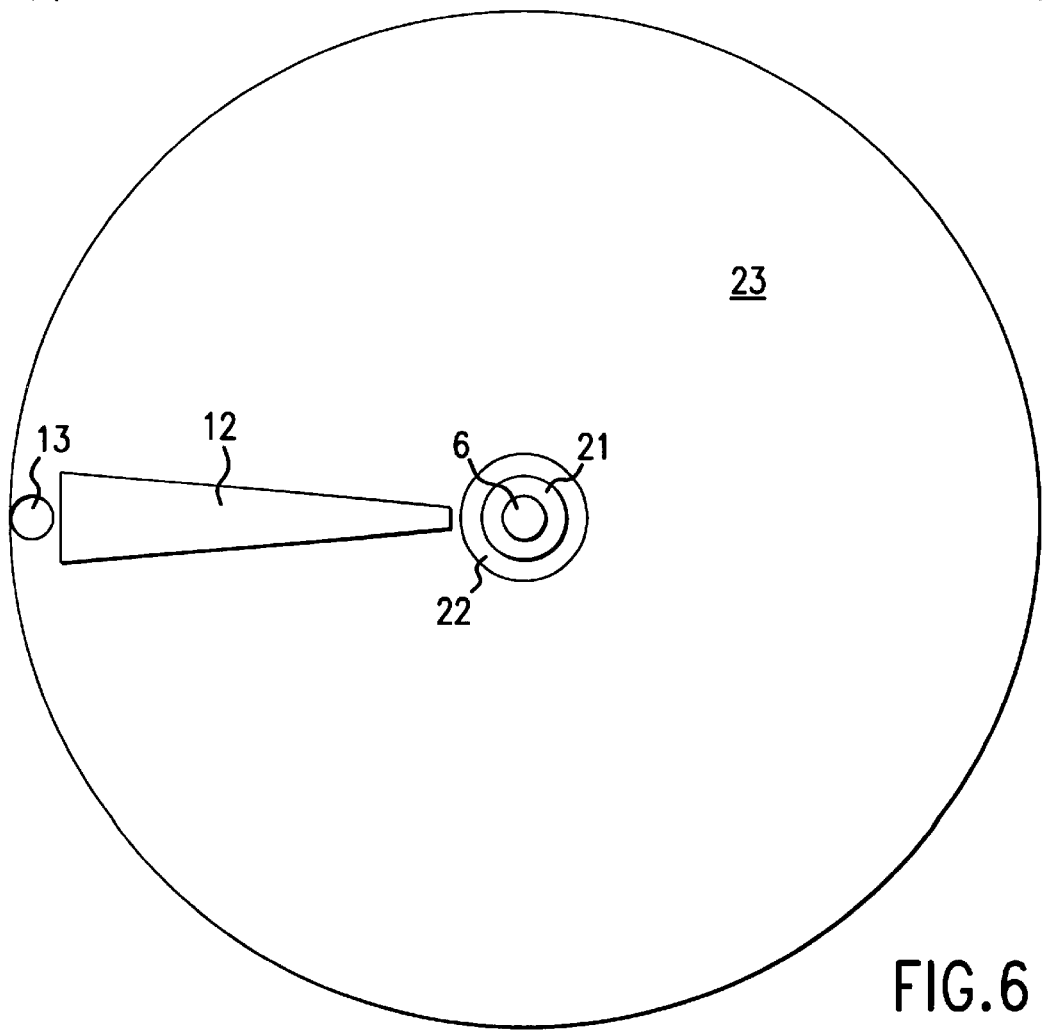

Analogously, there is a groove (12) located radially, and closed by the corresponding lateral walls, which permits the aluminum sheets to drop from one tray to the one below after having travelled over the entire upper surface (23) of the tray, following the path diagrammed in FIG. 7, and pushed by a rake as shown in FIG. 6.

Figure 7:
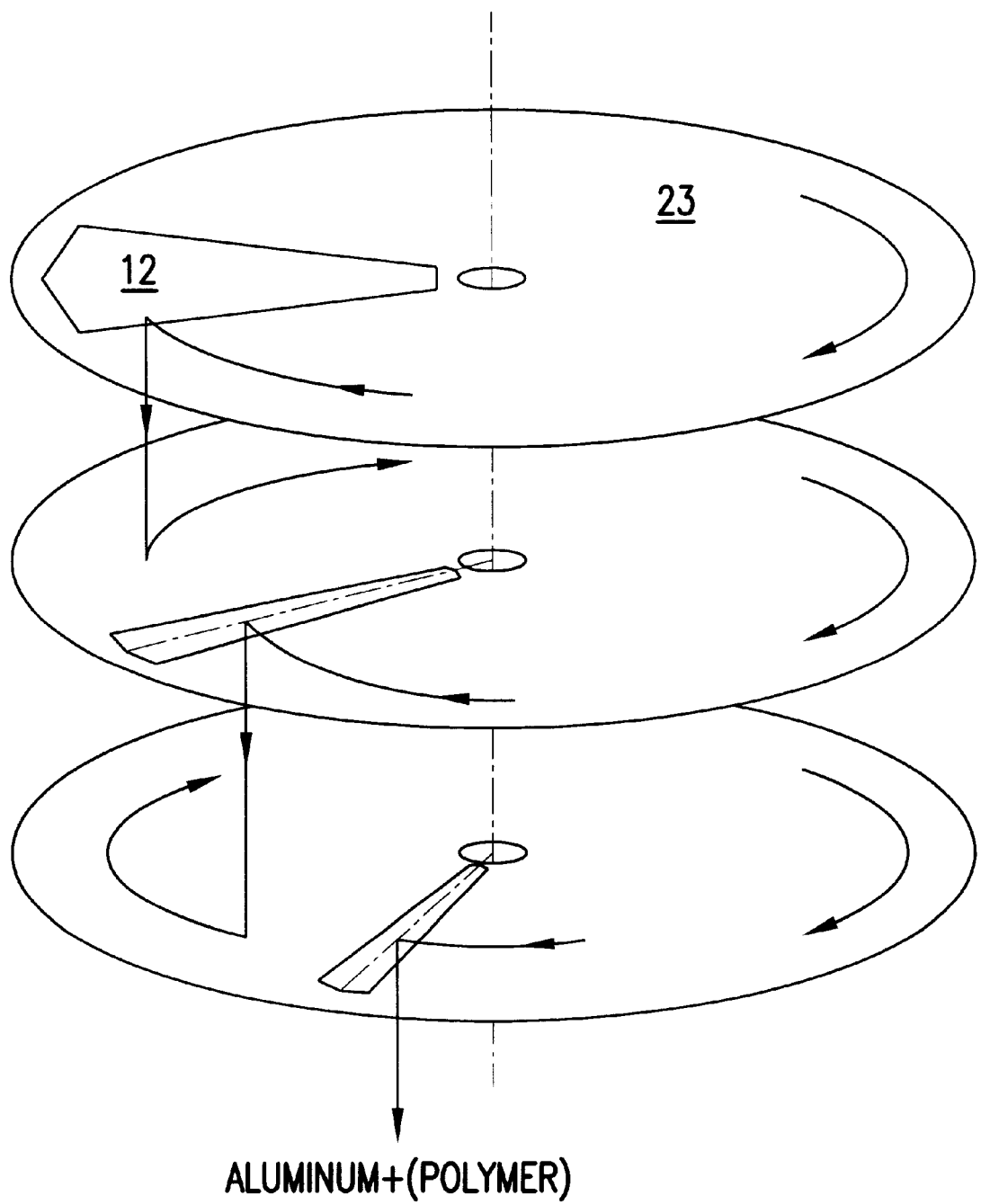
FIG. 7 is a diagram showing the circulation of the product over the trays.

Finally, the combustion gases used to heat these trays, which circulate through the interior of the cylinder, pass from one level to another through the connecting flue (13) as seen in FIG. 7.

While the product to be treated goes from top to bottom, the heating gas, as can be seen in FIG. 6, goes from bottom to top, and this countercurrent movement helps to produce the highest temperatures in the lower tray, where the aluminum loses the final portions of polymers without decomposing.

In FIG. 6, an area (25) is indicated under the upper surface (23) of the tray, where optionally, it is possible to place fins, roughened areas or any other means that help to increase the calorific transmission of the gas to the heating surface (23).

The entrainment of the aluminum sheets is implemented, as shown in FIG. 6, by rakes that extend from an arm (8) that is integral with axis (6), by means of a bracket (21), and the axis passes with clearance through the opening (22), leaving sufficient space so that the heavy fraction from the polyethylene pyrolysis drains through it, but not enough so that the aluminum sheets can pass, which can only exit via groove (12), after having travelled over the entire heated surface.

Figure 5:
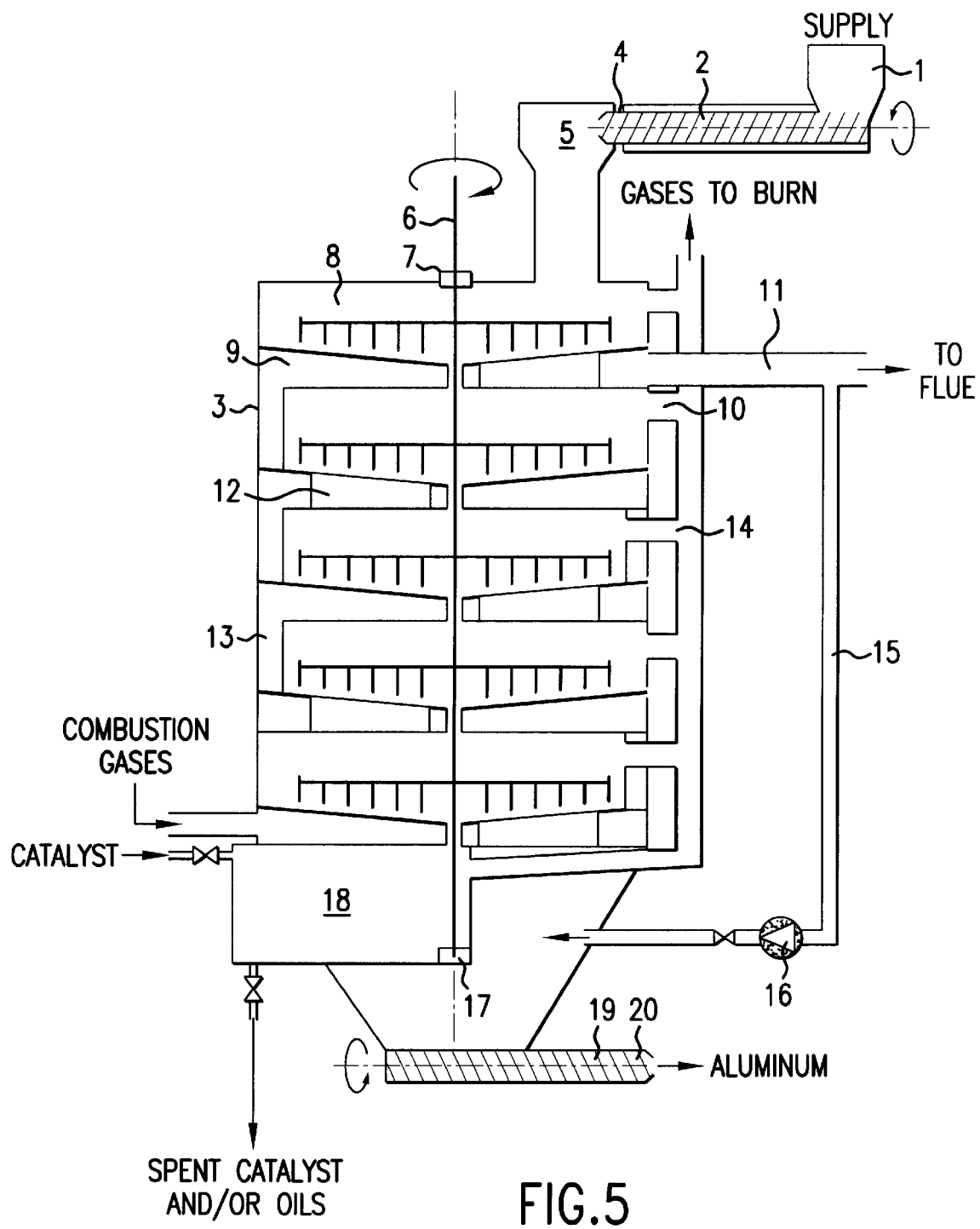
FIG. 5 is a view of the oven according to the invention, wherein the unvaporized pyrolysis products are collected in a container intended for that purpose.

As shown in FIG. 5, the gases formed by pyrolysis leave through a lateral pipe (10) which leads to a collector (14).

On the other hand, the discharge of these gases is promoted by the intake of the combustion gases produced by heating, and diverted by a pipe (15), as shown in FIG. 5, and impelled by an adjustable feed pump (16).

Underneath the final tray there is a container (18), which is located eccentrically, and axis (6) rests in the bottom of this container, supported by a bearing (7), and the non-volatile fraction (oils) of the pyrolysis draining through the axis drop into this tank.

These oils or waxes, which chemically are paraffins and olefins, can be subjected to catalytic cracking in the same oven, by introducing a suitable catalyst into the tank, and they can be discharged from the oven for direct use as such, or for the appropriate chemical treatment to obtain, via synthesis, high-grade aromatic hydrocarbons.

In any case, given that the product is always usable, this invention provides only for the physical possibility of implementing this operation "in situ".

The invention provides for certain hermetic sealing of the system, which provides for suitable closure of the three key points of the equipment, two of which are the product supply and the aluminum discharge, and the third is the passage of the axis.

The supply takes place through a hopper (1), which discharges into an endless screw (2), by means of heating the product until it reaches approximately 100° C., which first causes drying (the water vapor goes back to the hopper), and finally, melting of the polyethylene.

In this way, when the helix pitch of the final section (4) of the endless screw is reduced, as shown in FIG. 5, this produces a suitable hermetic seal, and the endless screw discharges into the upper tray through chamber (5).

The aluminum is discharged after it drops, through the final groove 12, which is located diametrically opposite box (18), into a hopper, formed by the bottom of the oven, and from this hopper, an endless crew (19) discharges it to the outside, and the seal is obtained by compression on the sheets by the final section (20) of the screw.

It should be pointed out that in FIG. 5, the hopper is referenced by (1), the endless screw by (2), the oven housing by (3), the screw compression zone by (4), the discharge opening by (5), and the so-called axis by (6).

In the same figure, a sealing box is represented by (7), an entrainment arm by (8), a tray by (9), the gaseous fraction discharge by (10), the heating gas discharge by (11), the descending groove by (12), the connecting flue by (13), the gaseous fraction collector by (14), the entrainment gas by (15), the gas impeller pump by (16), the bearing by (17), the heavy fraction tank by (18), the second endless screw by (19), and the screw compression zone by (20).

FIG. 6 incorporates some of the components previously referenced in the previous figure, a bracket (21), a dropping orifice (22), the upper surface of the tray (23), the lower surface of the tray (24), and the optional fins or roughened area (25).

FIGS. 7 and 8 include components that have already been referenced.

What is claimed is:

1. A process for the recovery of aluminum and energy from used packages comprising:

providing such packages in a condition wherein an outer paper wrapper has been removed leaving an aluminum sheet between first and second polyethylene film layers;

providing an oven having a chamber having a wall;

maintaining the wall between 200° C. and 660° C.;

passing the sheets through the chamber along a path of travel of a length effective to permit pyrolysis of the polyethylene film layers;

collecting a heavy fraction from the polyethylene pyrolysis;

causing a flow of gas to entrain a light fraction from the polyethylene pyrolysis;

collecting the entrained light fraction; and collecting the aluminum sheets remaining from the polyethylene pyrolysis.

2. The process of claim 1 further comprising using the collected light fraction as fuel.

3. The process of claim 1 wherein the step of passing the sheets through the chamber comprises:

sequentially passing the sheets over a top-to-bottom series of trays within the chamber, the sheets being impelled along upper surfaces of the trays by a plurality of entrainment arms, each coupled to a central shaft and associated with an associated one of the trays, the sheets falling from tray to tray through radial openings.

4. The process of claim 3 wherein:

the step of maintaining comprises maintaining the wall between 300° C. and 500° C.;

the light fraction comprises hydrocarbon chains having from 3 to 18 carbon atoms;

the heavy fraction comprises hydrocarbon chains having more than 18 carbon atoms; and the step of collecting a heavy fraction comprises passing the heavy fraction through central openings in the trays having a clearance from the shaft.

5. A process for the recovery of aluminum and energy from used material comprising:

providing such material comprising aluminum sheets each between first and second polyethylene film layers;

providing an oven having a chamber having a wall;

maintaining the wall between 200° C. and 660° C.;

passing the sheets through the chamber along a path of travel of a length effective to permit pyrolysis of the polyethylene film layers, a temperature within the oven increasing along at least a portion of the path wherein pyrolysis occurs;

collecting a heavy fraction from the polyethylene pyrolysis;

causing a flow of gas to entrain a light fraction from the polyethylene pyrolysis; and collecting the entrained light fraction.

6. The process of claim 5 further comprising using the collected light fraction as fuel.

7. The process of claim 5 wherein the step of passing the sheets through the chamber comprises:

sequentially passing the sheets over a top-to-bottom series of trays within the chamber, the sheets being impelled along upper surfaces of the trays by a plurality of entrainment arms, each coupled to a central shaft and associated with an associated one of the trays, the sheets falling from tray to tray through radial openings.

8. The process of claim 7 wherein:

the step of maintaining comprises maintaining the wall between 300° C. and 500° C.; and the step of collecting a heavy fraction comprises passing the heavy fraction through central openings in the trays having a clearance from the shaft.

9. The process of claim 7 wherein the step of passing the sheets comprises:

using an endless screw to discharge the sheets to an upper one of the trays, the screw having a final section of locally reduced helix pitch effective to produce a seal; and using a second endless screw to discharge the sheets from the oven, the second screw having a final section of locally reduced helix pitch effective to produce a seal.

10. An oven for the recovery of aluminum and energy from used packages, comprising:

a supply means for suppling used packaging material comprising aluminum sheets having two sides and a film of polyethylene on each side;

a chamber receiving the sheets from the supply means and having a wall maintained at a wall temperature between 200° C. and the 660° C.;

a series of trays (9) within the chamber, each with a diameter that is greater than its height, and having:

a concave upper surface (23);

a lower surface (24);

a central orifice (22) between the upper and lower surfaces; and a radial opening (12) between the upper and lower surfaces;

a central revolving shaft (6) extending through the central orifices (22), a plurality of entrainment arms (8), each coupled to the shaft (6) and associated with an associated one of the trays (9), the entrainment arms impelling the sheets along the associated upper surfaces (23) such that the sheets fall through the associated radial openings (12) while pyrolysis of the polyethylene of the films occurs;

a clearance between the shaft (6) and the orifices (22) sufficient to permit a heavy fraction from the pyrolysis to pass, but insufficient to permit the aluminum sheets to pass;

a container for receiving the heavy fraction from a bottom one of the trays; and a collector for receiving a light fraction from the pyrolysis entrained in a flow of gas.

11. The oven of claim 10 wherein:

the light fraction comprises hydrocarbon chains having from 3 to 18 carbon atoms;

the heavy fraction comprises hydrocarbon chains having more than 18 carbon atoms; and the wall temperature is between 300° C. and 500° C.

12. The oven of claim 10 wherein the supply means comprises an endless screw (2) for discharging the sheets to an upper one of the trays, the screw having a final section (4) of locally reduced helix pitch effective to produce a seal.

13. The oven of claim 12 further comprising:

a second endless screw (19) for discharging the sheets from the oven and having a final section (20) of locally reduced helix pitch effective to produce a seal.

14. The oven of claim 10 further comprising:

a means for supplying combustion gas to heat the trays (9) and circulate through the chamber interior, and a connecting flue (13) for allowing the combustion gas to pass from one level to another, such that while the sheets to be treated travel from top to bottom, the combustion gas goes from bottom to top, so that a highest temperature is reached in the bottom tray, and in said bottom tray, the aluminum sheets lose final portions of the polyethylene without decomposing.

15. The oven of claim 10 further comprising:

a lateral pipe coupled to said collector (14) for allowing pyrolysis gases and the light fraction to exit through a discharge (10), a burner for burning said gases downstream from said collector, and a pump (16) for promoting the discharge of said gases, said pump situated so as to intake combustion gases produced by heating of the chamber.

16. The oven of claim 10 wherein:

the container is situate eccentrically under the bottom tray, and the shaft (6) rests in a bottom of the oven supported by a bearing (17), such that the heavy fraction, comprising non-volatile oils from the pyrolysis, drops into the container, while the aluminum drops into the radial opening of the bottom tray which is opposite the container.

17. The oven of claim 10 wherein each entrainment arm carries a rake.

18. An oven for the treatment of material, comprising:

a supply means for suppling of used material comprising aluminum sheets having two sides and a film of polyethylene on each side;

a chamber receiving the sheets from the supply and having a wall maintained at a wall temperature between 200° C. and the 660° C. such that pyrolysis occurs;

a series of trays (9) within the chamber from a top tray to a bottom tray;

a connecting flue (13), for passing combustion gas from one level to another from bottom to top so as to circulate through the chamber interior and heat the trays (9) so that a highest temperature is reached in the bottom tray, and in said bottom tray, the aluminum sheets lose final portions of the polyethylene without decomposing;

a container for receiving a heavy fraction from the pyrolysis; and a collector for receiving a light fraction from the pyrolysis entrained in a flow of gas.

19. The oven of claim 18 wherein:

each tray has:

a concave upper surface (23);

a lower surface (24);

a central orifice (22) between the upper and lower surfaces; and a radial opening (12) between the upper and lower surfaces; and the container is situated such that it receives the heavy fraction from the bottom tray.

20. The oven of claim 19 further comprising:

a central revolving shaft (6) extending through the central orifices (22), a plurality of entrainment arms (8), each coupled to the shaft (6) and associated with an associated one of the trays (9), the entrainment arms impelling the sheets along the associated upper surfaces (23) to fall through the associated radial openings (12) while pyrolysis of the polyethylene of the films occurs; and a clearance between the shaft (6) and the orifices (22) sufficient to permit a heavy fraction from the pyrolysis to pass, but insufficient to permit the aluminum sheets to pass.

* * * * *